May 17, 1949.  W. TURNWALD  2,470,380
VARIABLE-CAPACITY CONTROLLER FOR COMPRESSORS
Filed April 20, 1945  3 Sheets-Sheet 1

Inventor
Wolfgang Turnwald
By Dodge and Son
Attorneys

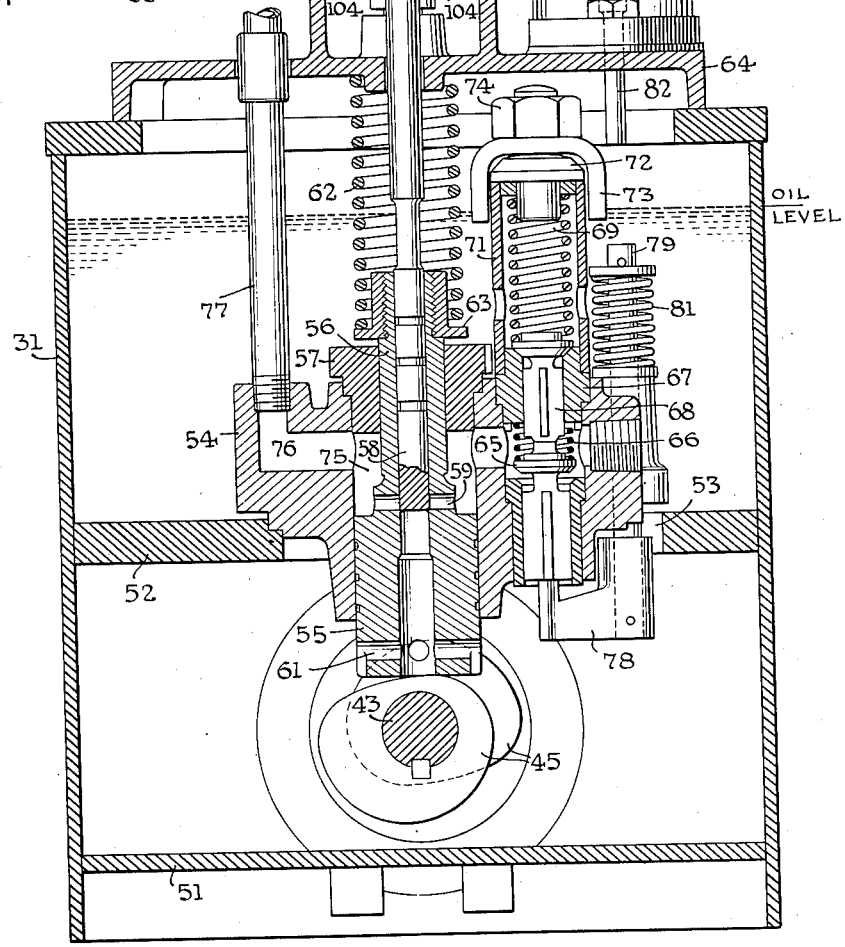
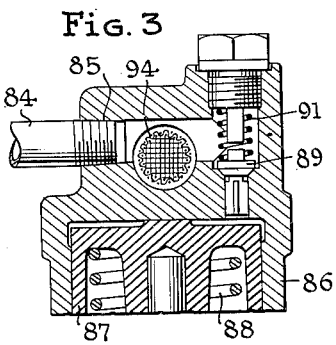
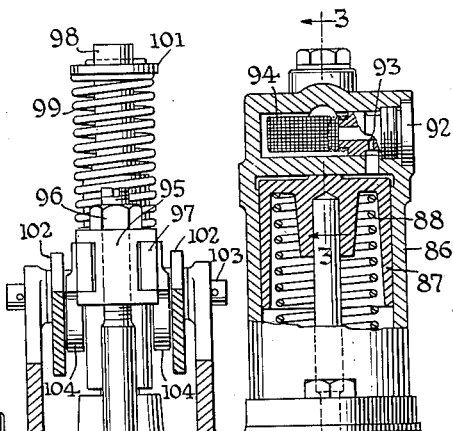

May 17, 1949.  W. TURNWALD  2,470,380
VARIABLE-CAPACITY CONTROLLER FOR COMPRESSORS
Filed April 20, 1945  3 Sheets-Sheet 3

Inventor
Wolfgang Turnwald

By Dodge and Sons
Attorneys

Patented May 17, 1949

2,470,380

UNITED STATES PATENT OFFICE 2,470,380

VARIABLE-CAPACITY CONTROLLER FOR COMPRESSORS

Wolfgang Turnwald, Milwaukee, Wis., assignor to Nordberg Manufacturing Company, Milwaukee, Wis., a corporation of Wisconsin Application April 20, 1945, Serial No. 589,357

8 Claims. (Cl. 230—25)

This invention relates to progressive capacity control for compressors having suction operated inlet valves. It is an improvement on the controller described and claimed in the patent to Nordberg, 2,134,834, November 1, 1938.

The Nordberg patent discloses a displacing unit which delivers timed hydraulic pressure impulses to motors which suspend the action of the inlet valves. The patent proposes two alternative schemes of control of such compressor inlet valves, and the present invention is adaptable to either. It will be described as applied according to the preferred scheme of operation in which the valve controllers hold the inlet valves open during the initial portion of the discharge stroke, and for variable periods. Thus the valves are allowed to close throughout the discharge stroke at full capacity. As capacity is reduced they close at points later and later in the discharge stroke until they do not close at all, when the compressor is completely unloaded.

Since the valve controllers are actuated by unidirectional timed hydraulic impulses, they must be biased, and springs are used for this purpose. The bias could act in either direction, but the preferred arrangement, here illustrated, uses controllers which are biased so as to hold the inlet valves open, and are retracted by the hydraulic impulses. This arrangement, also shown in the Nordberg patent, has the advantage that the reaction upon the valves is limited to the stress developed by the biasing spring.

Novel features of the present device, are a simple starting unloader that operates through the capacity control, a simplified pressure responsive mechanism, a simple and precise arrangement for varying the duration of impulses, and various structural details which favor economy in manufacture and render the device applicable to a considerable range of compressors.

A controller for two valves or sets of valves timed at 180° of crank angle is illustrated in the accompanying drawings, in which:

Fig. 2 is a section on the line 2—2 of Fig. 1.

Fig. 3 is a fragmentary axial section through the head of the starting unloader motor on the line 3—3 of Fig. 2.

Figure 1:
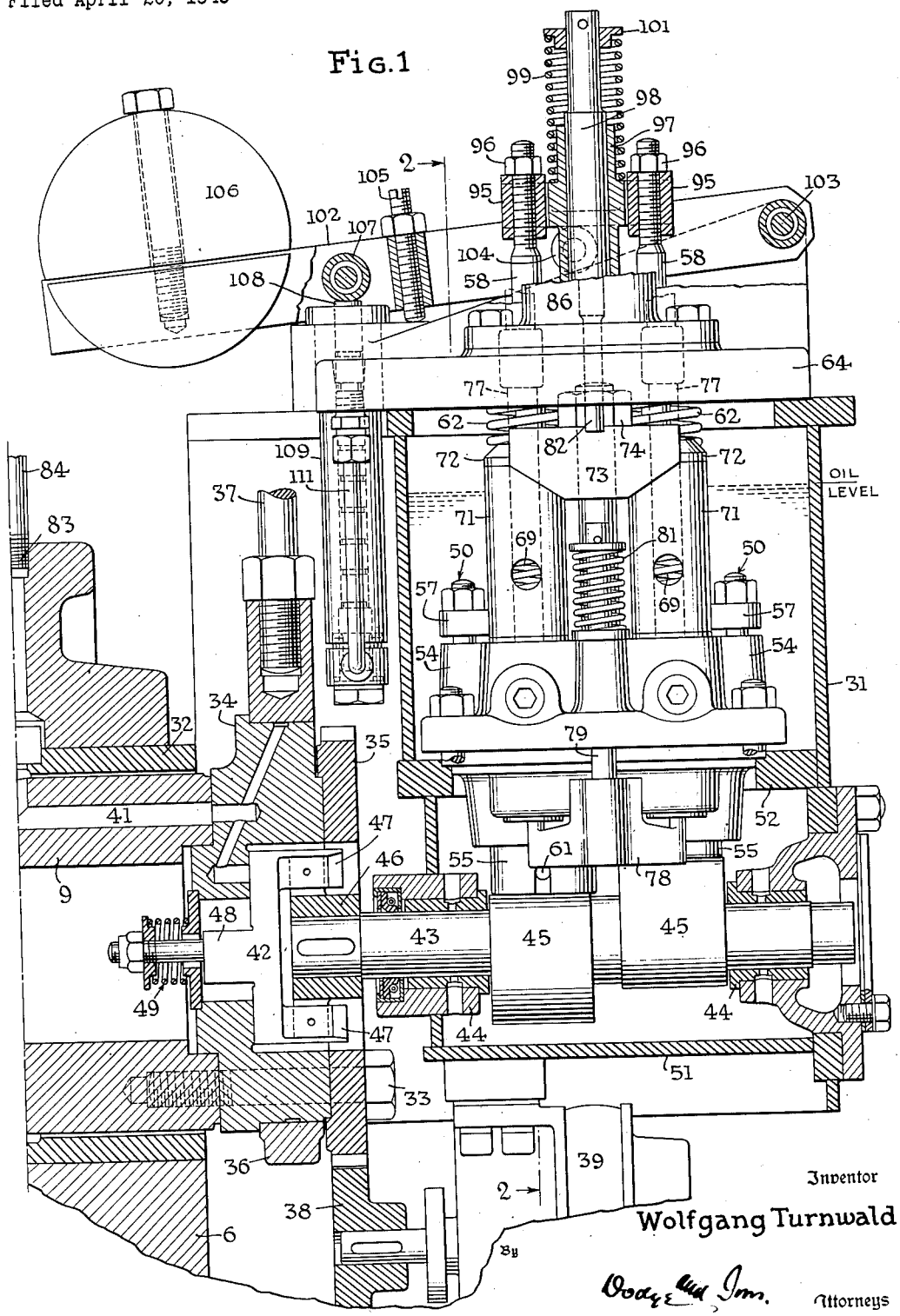
Fig. 1 is a view partly in elevation but chiefly in vertical axial section through the impulse unit. The driving connection between the shaft of the impulse unit and the compressor crankshaft is shown.
Figure 4:
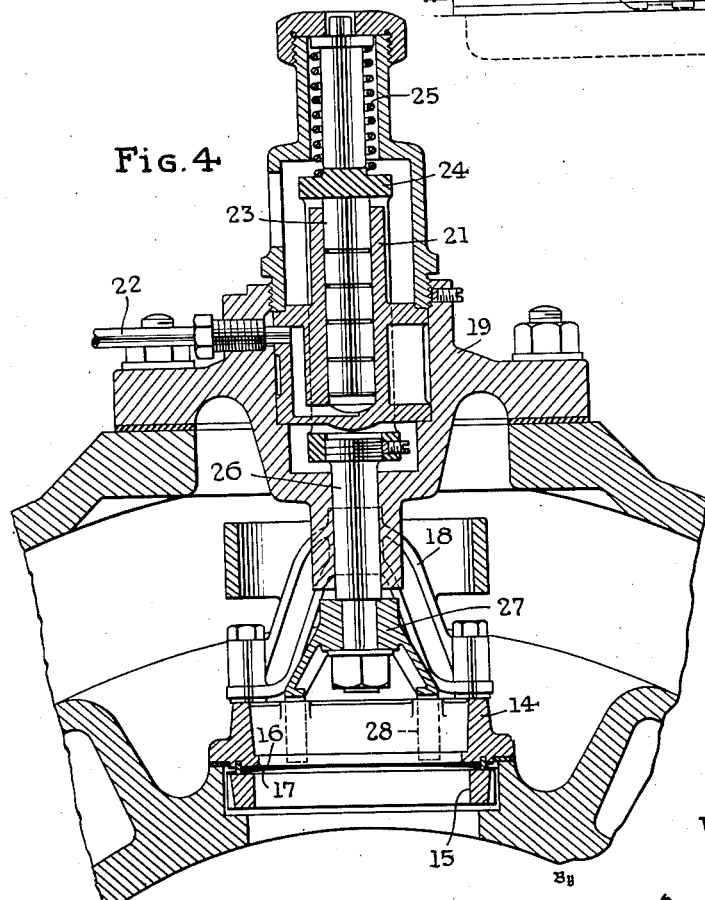
Fig. 4 is a fragmentary section through a typical inlet valve controlling unit.

NOTE.—Figs. 1–3, inclusive show the parts positioned as they would be at starting with no air pressure in the receiver and no oil pressure in the shaft lubricating system. Fig. 4 shows the valve controller in the position it assumes under hydraulic pressure, i. e. retracted to permit the inlet valve to close.

Figure 5:
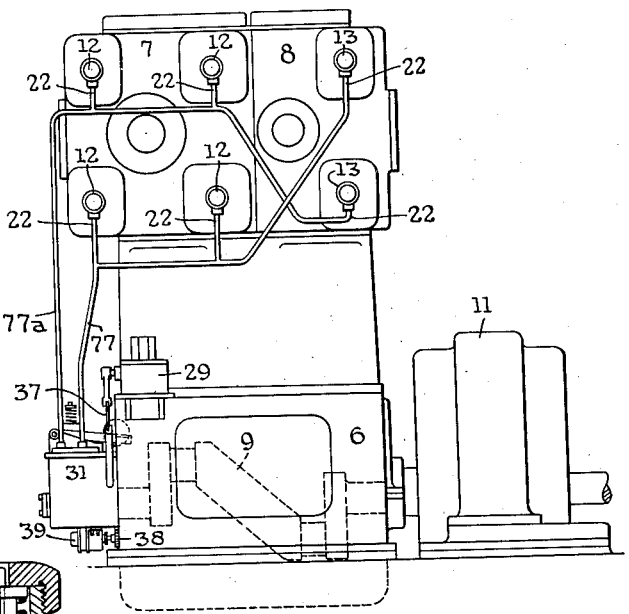
Fig. 5 is an elevation of a 2-cylinder, 2-stage vertical compressor, having the invention applied.

Refer first to Fig. 5. The compressor has a base frame 6, first-stage cylinder 7, second-stage cylinder 8, and two-throw crankshaft 9 driven by an electric motor 11 whose shaft is directly connected to the crankshaft 9. The cylinders are double-acting, and the first-stage has pairs of inlet valves 12 for each working space. The second-stage has one inlet valve 13 for each working space. This arrangement permits the inlet valves to be identical, but does not impose this as a requirement. A typical inlet valve is shown in Fig. 4.

Inlet valves are of the so-called reed or feather type described in the patent to Nordberg, 1,570,392, January 19, 1926. The particular embodiment thereof illustrated in the present application is illustrated and described in detail in the Nordberg Patent 2,134,834 above mentioned.

So far as is necessary for an understanding of the present invention, the valve may be described as follows:

There is a grid-like seat member 14 and a related grid-like guard member 15. The valve proper comprises strips 16 of thin steel plate and each is seated by a related bow spring 17. The yoke indicated at 18 is a part of a hold-down mechanism to retain the seat 14 in place, and is sustained by the bonnet 19. Mounted in the bonnet is a cylinder member 21 closed at its inner end and subject at its inner end to hydraulic pressure delivered through the connection 22.

A plunger 23 is connected to a yoke 24 and this is biased inward by a coil compression spring 25. The yoke 24 is adjustably connected rigidly to the push rod 26, which is guided in a portion of the bonnet and which carries at its lower end a comb 27. This includes a series of spaced blade-like fingers 28 so arranged that when the plunger 23 is allowed to move inward under the urge of the spring 25, the fingers hold the valve strips 16 away from the seat 14, and thus maintain the inlet valve open. When, however, sufficient pressure is developed in the connection 22 to overpower the spring 25, the fingers are retracted and the valve strips are free to close against the seat member 14.

The details of the construction of the valve 4 are not a feature of the present invention. They are illustrated to show one type of valve which might be controlled according to the present invention.

In Fig. 5 a cylinder lubricator 29 is indicated. It is not a part of the present invention, but since its drive is associated with the valve controller, it is identified.

Mounted on the end of the base 6 is the housing 31 of the impulse device, in which device are embodied the important novel features of the present invention. The details of this mechanism are shown in Figs. 1 to 3, inclusive to which reference should now be made.

The end of the shaft 9 appears in Fig. 1 and is shown as tubular. One of the main crankshaft bearings is indicated at 32. Connected to the end of shaft 9 by threaded connectors 33 are an eccentric 34 and gear 35. The eccentric 34 is encircled by a strap 36 whose rod 37 operates the lubricator 29. The gear 35 drives the pinion 38 which is on the shaft of the oil pump 39. The pump 39 delivers oil under pressure of say fifteen or twenty pounds per square inch to passages 41 drilled in the crankshaft. These passages deliver oil to the main bearings, the crank bearings of the compressor, etc., according to familiar practice in the part.

An extension of the passage 41 formed within the eccentric 34, as shown, lubricates the eccentric strap bearing and also the part numbered 42 which is the floating member of an Oldham coupling affording a drive between the shaft 9 and the actuating shaft 43 of the impulse mechanism. The shaft 43 is mounted in bearings 44 which are supported, as clearly shown in Fig. 1, by a portion of the housing 31. The shaft 43 carries two cams 45 which are of identical contour and which are displaced angularly 180° from each other.

The construction of the Oldham coupling is such as to assure correct assembly. A slotted hub 46 is keyed on the end of the shaft 43 and the slots receive respective lugs 47 which extend from the righthand face of the member 42. Projecting from the lefthand face of the member 42 is a transverse rib 48 which is slidable in a transverse slot formed in the eccentric 34. The spring assembly shown generally at 49 acts to hold the member 42 to the left so that it seals the end of the lubricating port described as formed in the eccentric 34. This is simply an expedient to prevent the escape of oil. The member 42 is asymmetric to the extent that the rib 48 is not centered on a diameter but is offset slightly so that only one assembled relation with the eccentric is possible. The purpose is to insure the intended angular relationship between cams 45 and the shaft 9.

The housing 31 has a bottom 51 and thus serves as a reservoir which retains a bath of oil. This oil substantially fills the housing, i. e. to the depth indicated by legend "oil level." There is also a transverse horizontal member 52 which serves as a support for the hydraulic cylinder unit hereinafter described. The member 52 is not, however, a partition as free flow through it is permitted at 53.

While the impulse mechanism might include any desired number of impulse units from one up, a duplex unit has been chosen for description since that is the simplest embodiment which could be illustrated and still disclose the use of a plurality of timed units.

These timed units are essentially identical and the description of one unit will suffice. A cylinder body 54 is rigidly mounted on the member 52. It has two cylinder bores, one for each unit. Both cylinders are visible in Fig. 1, and one is shown in section in Fig. 2. Each cylinder is open at its lower end and is located immediately above the corresponding one of the cams 45. Through this open lower end works the large head 55 of a differential piston whose smaller or neck portion 56 works in a corresponding bushing or guide 57 fixed in the cylinder body 54. The bushings 57 are independent and they are held in place by studs and nuts 59, two of which are visible in Fig. 1.

The piston made up of the parts 55—56 is axially bored to receive a timing valve 58 whose lower end controls communication between the cross ports 59 and the lower portion of the axial bore above mentioned. The lower end of the head 55 is cross drilled at 61 to provide an escape path for oil. The lower end of head 55 engages the corresponding cam 45, the piston being biased into contact with the cam by a coil compression spring 62 which reacts between a spring seat 63 threaded to the upper end of neck 56 and a spring seat formed on the lower face of cover 64. The cover 64 is removably mounted on the top of the housing 31.

Mounted in the cylinder body 54 is a poppet type oil inlet valve 65 which coacts with a seat pressed into the body 54. The valve 65 is urged in a closing direction by a coil compression spring 66. The spring 66 seats against a removable bushing 67 which serves as a seat for a poppet type relief valve 68. The valve 68 is normally held closed by a spring 69 which is housed in tubular member 71 and reacts at its upper end against the spring seat 72, which closes the upper end of the tubular member 71.

As explained, there are two cylinder bores and each has its own inlet valve 65 and relief valve 68. There are two tubular members 71, each with its own spring seat 72. A yoke 73 retains both these springs seats, the yoke being held by a nut 74 threaded on a stud which is shown fixed to the cylinder body 54. The working space in each cylinder is the annular space 75 above the head 55. It is connected by a passage 76 with a tube 77. There is a tube 77 for each impulse cylinder 75. The connection of these tubes to the inlet valve controlling motors will be described later.

To unload the compressor at starting, recourse is had to the expedient of holding the inlet valves 65 open. So long as these valves remain open no impulses can be delivered through the connections 77, so that the springs 25 of the motors shown in Fig. 4 hold the compressor inlet valves open continuously. To hold the inlet valves 65 open there is provided a shiftable spring-biased member which is allowed to force the valve open when there is no oil pressure in the passage 41 and is retracted to an inactive position some time after adequate oil pressure has been developed in passage 41. This mechanism is clearly visible in Figs. 1 to 3, inclusive.

A forked member 78 is provided with fingers positioned to engage the lower ends of both valves 65. The member 78 is mounted on a stem 79 which is guided vertically in a portion of the body 54 and is biased upward by a coil compression spring 81, which is stressed heavily enough to overpower both the springs 66 of the two inlet valves 65.

Thus unless the stem 79 is forced downward the inlet valves are held open. The stem 79 will be forced downward by a plunger 82 shortly after sufficient lubricating pressure has been developed in the passage 41. A branch of the passage 41 leads to a connection 83 at the main bearing 32. This is connected by a pipe 84 with the connection 85 which leads to the upper end of the starting unloading cylinder 86. A single-acting piston 87 works in the cylinder 86 and carries the plunger 82. The piston is biased upward to its inactive position by a coil compression spring 88 and the lower end of plunger 82 is spaced a considerable distance from the upper end of the stem 79, the plunger and the stem being axially aligned. Descent of piston 87 full stroke will move the yoke 78 far enough to free the valves 65 and permit them to close.

It is important to delay the loading action long enough to permit the motor 11 to come to speed, but it is equally important that the piston 87 return rapidly to its uppermost position when the motor is stopped, so that the compressor will be unloaded when and if the motor is immediately restarted. The effect is secured by using an asymmetric flow connection between the pipe 84 and the working space in cylinder 86. This is arranged as follows.

A check valve 89 lightly loaded by coil compression spring 91 permits rapid back flow to the connection 85 (see Fig. 3), but a throttling plug 92 screwed into the head of the cylinder 86 and having a restricted port 93 (see Fig. 2) greatly delays flow of oil from connection 85 to the space above the piston 87. To protect the port 93 from becoming clogged, a fine strainer 94 is mounted on the entrance end of the plug 92.

It follows that if the compressor is stopped the piston 87 moves up promptly upon the dissipation of oil pressure and allows the unloading yoke 78 to become effective almost immediately. When the compressor is started, however, it takes some time for the lubricating oil to move the piston 87 through its idle motion. As a result the impulse mechanism remains unloaded throughout the starting phase and for a period long enough to enable the electric motor 11 to come to speed. Unloading of the impulse mechanism results in concurrent unloading of the compressor.

The timing of impulses is controlled solely by the cams 45. These cams are designed to give smooth acceleration and deceleration of the plunger, and they are so designed that upward motion of the plunger 55 commences slightly in advance of the commencement of the displacement stroke of the related compressor cylinder, so that under full load conditions the fingers 28 will move clear of the inlet valve during the terminal position of the suction stroke, permitting the valve to close automatically at the very commencement of the discharge stroke. The displacing action continues for somewhat more than 180°, so that the fingers 28 will be held retracted until after ensuing suction stroke has started and the valve 16 has opened. In consequence of this timing the fingers 28 at times prevent the valve from closing and then permit it to move to its seat, but they never strike it from its seat.

The duration of such impulses is varied by varying the time at which the impulse commences. This is done by varying the position of the valve member 58. With the valve 58 in the position shown in Fig. 2, the impulse would start at the commencement of upward motion of the head 55 and would continue throughout such upward motion. If the valve 58 be lifted from the position there shown the piston 55 would have to move far enough to cause the lower margin of port 59 to overtravel the lower end of the valve 58, before the impulse would start.

The position of valve 58 (and in this connection it should be remembered that there is one such valve for each impulse cylinder) is controlled by a pressure-responsive device which will now be described. Adjustably threaded on the upper end of each valve stem 58 is a corresponding collar 95 which is locked in position by a check nut 96. The collars 95 are engaged by a forked yoke 97 (see Fig. 2) which is vertically slidable on a guide rod 98 and which is biased in a downward direction by a coil compression spring 99. The spring 99 reacts between the yoke and the spring seat 101 pinned to the top of the guide rod 98.

A bifurcated lever 102 straddles the yoke 97 and is hinged at 103 on lugs carried by the cover 64. The lever is loaded by a weight 106 which is clamped thereto, and may be adjusted in the direction of the length of the lever to vary its effect. Downward motion of the lever is limited by an adjustable stop screw 105. The lever carries a pair of rollers 104 which underlie the yoke 97.

Mounted between the arms of the lever 102 is a roller 107 which engages the upper end of a plunger 108. The plunger works in a cylinder 109 to the lower end of which a connection 111 leads. The connection 111 transmits to the plunger 108 the head pressure against which the compressor operates. This might be sensed at or near the discharge connection from the second-stage cylinder 8, in cases where no receiver is used. Where a receiver is used, the connection would be made to such receiver.

In any event, the weight 106 determines the minimum pressure which will cause lever 102 to move upward, and the spring 99 furnishes the scale or range of graduation between full compressor capacity attained when the lever 102 is in its lowermost position and a completely unloaded state.

It will be observed that the stroke of the plunger 23 is constant but that the working stroke, i. e. the effective displacing stroke of the plunger 55, is variable being maximum when the compressor is working at full capacity. The function of the relief valve 68 is to dissipate excess oil displaced in each stroke. It follows that the strength of the spring 69 must be sufficient to make sure that the spring 25 (Fig. 4) is overpowered, but should not greatly exceed the necessary value. In determining the strength of the spring 69 account must be taken of friction in the flow connections.

In Fig. 5 connection 77, which is the one of the two nearest the compressor, is shown connected to the branches 22 of three inlet valves. These are the two crank-end valves of the first-stage and the head-end valve of the second-stage. The other impulse connection indicated in Fig. 5 as 77a controls the head-end inlet valves of the first-stage and the crank-end inlet valve of the second-stage.

Operation

Assume that the compressor has been shut down and that there is no air pressure in connection 111. The parts would be in the positions shown in Figs. 1 to 3, inclusive. When the motor 11 starts the compressor will be completely unloaded because the yoke 78 holds both of the inlet valves 65 open. Consequently the springs 25 hold all the inlet valves 16 of the compressor continuously open.

As soon as the compressor has operated long enough to develop pressure in the lubrication passages 41 this pressure will be transmitted through the pipe 84 and restricted opening 93 to the space above piston 87. The slow descent of piston 87 will ultimately force the yoke 78 downward and thus allow the inlet valves 65 to close. It has been assumed that there was no pressure in the discharge connection of the compressor. Accordingly, lever 102 would be in its lowermost position. The valves 58 would therefore cause their respective plungers to displace oil throughout their full strokes. Consequently the inlet valves of the compressor will be allowed to close at the beginning of the discharge stroke and remain closed throughout the discharge stroke.

If the discharge connection of the compressor should be under sufficient pressure when the motor 11 starts, the lever 102 would be in some elevated position in which the compressor would operate at diminished capacity. Elevation of the valves 58 renders the displacing plungers 55 ineffective for the initial part of their strokes, and the extent of elevation determines where in these strokes the plungers become effective.

When the motor 11 is stopped, the pressure in passages 41 fades quite rapidly. The piston 87 moves up promptly because the check valve 89 permits back flow to occur without limitation by the port 93. Hence the yoke 78 becomes effective almost immediately to open and hold open the inlet valve 65 of the impulse cylinder.

This invention provides two related but distinct functions. It provides for complete unloading during starting and a rapid resetting of this unloading mechanism if the motor be stopped even for a brief period. In addition, the invention provides an automatic variable capacity control which responds to discharge pressure. This phase of the invention involves suspension of the operation of the inlet valves for variable periods.

While I prefer to use it as described to hold the inlet valves open during a variable initial portion of the discharge stroke, it can be used according to the alternate principle described in the prior Nordberg patent. The described arrangement is believed to be preferable because the springs 25 on the inlet valves tend to establish an unloaded condition, and because the reaction on the inlet valves is limited to the force delivered by the springs.

Another advantage of the arrangement is that it is favorable to the incorporation of the starting unloader in that the disablement of the oil displacing mechanism assures that the compressor inlet valves will remain in unloaded condition. The invention is applicable to more than two groups of valves simply by the duplication of the displacing units. Thus while one embodiment has been described in great detail this is intended to illustrate the principles of the invention. These principles are broader than any particular embodiment thereof, and may be incorporated in a number of mechanisms which differ in detail. The claims alone define the scope of the invention.

What is claimed is:

1. The combination of a compressor having inlet and discharge valves; at least one hydraulic motor operable to control the operation of an inlet valve; a hydraulic cylinder; a piston reciprocable in said cylinder and defining an impulse space therein; a connection between said impulse space and said hydraulic motor; a valve guided in said piston, shiftable in the direction of motion of the piston and serving by coaction with the piston to control a free vent from the impulse space, said valve being indifferent to pressure developed in the impulse space; means responsive to pressure developed by operation of the compressor and serving to adjust the position of said valve; an inlet valve for the impulse space; a loaded relief valve for releasing excess pressure developed in the impulse space; and means for reciprocating said piston in timed relation to cycles of the compressor.

2. The combination of a compressor having inlet and discharge valves; at least one hydraulic motor operable to control the operation of an inlet valve; an open-ended shouldered cylinder; a coacting shouldered piston exposed at both ends of said cylinder and having an axial bore communicating by lateral ports with an annular impulse chamber defined by the piston within the cylinder; a connection between said impulse space and said hydraulic motor; a valve extending through one end of the piston, shiftable axially in said bore with reference to the cylinder and piston and controlling said lateral ports to time venting flow from said impulse chamber; means for adjusting the position of said valve; an inlet valve for the impulse space; a loaded relief valve for relieving excessive pressure on the impulse space; and means reacting upon the other end of the piston for reciprocating the piston in timed relation to the cycles of a compressor.

3. The combination of a compressor having inlet and discharge valves; at least one hydraulic motor operable to control the operation of an inlet valve; an open-ended shouldered cylinder; a coacting shouldered piston exposed at both ends of said cylinder and having an axial bore communicating by lateral ports with an annular impulse chamber defined by the piston within the cylinder; a connection between said impulse space and said hydraulic motor; a valve extending through one end of the piston, shiftable axially in said bore with reference to the cylinder and piston and controlling said lateral ports to time venting flow from said impulse chamber; means for adjusting the position of said valve; an inlet valve for the impulse space; a loaded relief valve for relieving excessive pressure on the impulse space; means reacting upon the other end of the piston for reciprocating the piston in timed relation to the cycles of a compressor; a pressure motor subject to pressure developed by operation of the compressor for operating said valve-adjusting means; and two means opposing the action of said motor, one of which is a weight arranged to offer a uniform resistance to its action, and the other of which is a spring arranged to exert a resistance which gradually increases in proportion to the adjustment effected by the motor.

4. The combination of a compressor having inlet and discharge valves; a shiftable controller yieldingly biased to hold said inlet valve open; a hydraulic motor operative to shift said controller against said bias; a hydraulic cylinder; a piston reciprocable in said cylinder and defining an impulse space therein; a connection between said space and said motor; a valve guided in said piston, shiftable in the direction of motion of the piston and serving by coaction with the piston to control a free vent from the impulse space; means responsive to pressure developed by operation of the compressor and serving to adjust the position of said valve; an inlet valve for said impulse space; means effective when the compressor is being started and before it attains full operative speed to hold the last-named inlet valve open; and means for reciprocating said piston in timed relation to the cycles of the compressor.

5. The combination of a compressor having inlet and discharge valves and a lubricating system which is under pressure developed when the compressor runs; a shiftable controller yieldingly biased to hold said inlet valve open; a hydraulic motor operative to shift said controller against said bias; a hydraulic cylinder; a piston reciprocable in said cylinder and defining an impulse space therein; a connection between said space and said motor; a valve guided in said piston, shiftable in the direction of motion of the piston and serving by coaction with the piston to control a free vent from the impulse space; means responsive to pressure developed by operation of the compressor and serving to adjust the position of said valve; an inlet valve for said impulse space; a loaded relief valve for releasing excess pressure developed in the impulse space; means yieldingly biased and so arranged that when free to act it serves to hold open the inlet valve for the impulse space; and a motor subject to pressure developed in the lubricating system and serving when under full lubricating pressure to overcome the bias of the last named means.

6. The combination of a compressor having inlet and discharge valves and a lubricating system which is under pressure developed when the compressor runs; a shiftable controller yieldingly biased to hold said inlet valve open; a hydraulic motor operative to shift said controller against said bias; a hydraulic cylinder; a piston reciprocable in said cylinder and defining an impulse space therein; a connection between said space and said motor; a valve guided in said piston, shiftable in the direction of motion of the piston and serving by coaction with the piston to control a free vent from the impulse space; means responsive to pressure developed by operation of the compressor and serving to adjust the position of said valve; an inlet valve for said impulse space; a loaded relief valve for releasing excess pressure developed in the impulse space; means yieldingly biased and so arranged that when free to act it serves to hold open the inlet valve for the impulse space; a pressure motor operable to shift the last named means against said yielding bias; and an asymmetric flow connection between the last-named motor and said lubricating system, arranged to permit free flow from the motor to the system but to retard flow in the reverse direction.

7. The combination of a compressor which performs recurrent cycles; capacity controlling means cyclically adjustable to modify the volumetric efficiency of each cycle; means biasing said capacity controlling means in a compressor unloading direction; an expansible chamber motor for shifting said capacity controlling means against said bias; a cylinder; a piston reciprocable in said cylinder and defining therein an impulse space; a connection from said impulse space to said motor; a valve coacting with said piston to control a free vent from the impulse space, said valve being adjustable to vary its control point with reference to the piston stroke; means responsive to pressure developed by operation of said compressor for adjusting said valve; means for reciprocating said piston in timed relation to the cycles of the compressor; a relief valve for permitting relief of excess pressure developed in the impulse space; an inlet valve for the impulse space; and means effective under compressor-starting conditions to hold the last-named valve open.

8. The combination of a compressor which performs recurrent cycles; capacity controlling means cyclically adjustable to modify the volumetric efficiency of each cycle; means biasing said capacity controlling means in a compressor unloading direction; an expansible chamber motor for shifting said capacity controlling means against said bias; a cylinder; a piston reciprocable in said cylinder and defining therein an impulse space; a connection from said impulse space to said motor; a valve coacting with said piston to control a free vent from the impulse space, said valve being adjustable to vary its control point with reference to the piston stroke; means responsive to pressure developed by operation of said compressor for adjusting said valve; means for reciprocating said piston in timed relation to the cycles of the compressor; a relief valve for permitting relief of excess pressure developed in the impulse space; an inlet valve for the impulse space; a member yieldingly biased to hold open the inlet valve just named; a lubricating pump arranged to be driven when the compressor operates; a pressure motor arranged to retract said yieldingly biased member; and an asymmetric flow connection between the discharge of said lubricating pump and said pressure motor and arranged to delay response of the motor to rising pressure.

WOLFGANG TURNWALD.

REFERENCES CITED

The following references are of record in the file of this patent:

UNITED STATES PATENTS

| Number | Name | Date |
| --- | --- | --- |
| 1,606,060 | Cox | Nov. 9, 1926 |
| 2,134,835 | Nordberg | Nov. 1, 1938 |
| 2,137,219 | Aikman | Nov. 22, 1938 |
| 2,159,815 | McCune | May 23, 1939 |